(12) United States Patent
Fazekas

(10) Patent No.: US 9,308,788 B2
(45) Date of Patent: Apr. 12, 2016

(54) PNEUMATIC DEVICE FOR CONTROLLING THE AUTOMATIC INFLATION/DEFLATION, NOTABLY OF A TIRE

(76) Inventor: Stéphane Fazekas, Noailly (FR)

( * ) Notice: Subject to any disclaimer, the term of this patent is extended or adjusted under 35 U.S.C. 154(b) by 182 days.

(21) Appl. No.: 14/344,851

(22) PCT Filed: Sep. 12, 2012

(86) PCT No.: PCT/FR2012/052039
§ 371 (c)(1),
(2), (4) Date: Sep. 23, 2014

(87) PCT Pub. No.: WO2013/038107
PCT Pub. Date: Mar. 21, 2013

(65) Prior Publication Data
US 2015/0075642 A1   Mar. 19, 2015

(30) Foreign Application Priority Data

Sep. 13, 2011 (FR) .................................. 11 58104

(51) Int. Cl.
| | |
|---|---|
| *F16K 15/20* | (2006.01) |
| *B60C 29/00* | (2006.01) |
| *B60C 23/00* | (2006.01) |
| *F17D 3/01* | (2006.01) |
| *B60C 29/02* | (2006.01) |

(52) U.S. Cl.
CPC .............. *B60C 29/002* (2013.04); *B60C 23/003* (2013.01); *F17D 3/01* (2013.01); *B60C 29/02* (2013.01); *Y10T 137/2607* (2015.04); *Y10T 137/36* (2015.04)

(58) Field of Classification Search
CPC .................... Y10T 137/2544; Y10T 137/2605;
Y10T 137/2607; Y10T 137/26; Y10T 137/3646; B60C 29/00; B60C 29/02
See application file for complete search history.

(56) References Cited

U.S. PATENT DOCUMENTS

| | | | | |
|---|---|---|---|---|
| 3,491,786 A | * | 1/1970 | Bermingham | ........ F16K 15/207 137/102 |
| 3,747,626 A | * | 7/1973 | Valentino | ................ F16K 15/18 137/102 |
| 4,895,199 A | * | 1/1990 | Magnuson | ............ B60C 23/003 137/102 |
| 6,827,096 B1 | * | 12/2004 | Kayukawa | .......... F16K 17/0473 137/102 |
| 7,104,274 B2 | * | 9/2006 | Sampson | ............... F16K 15/205 137/224 |
| 2009/0095359 A1 | * | 4/2009 | Campau | .............. B60C 23/0496 137/226 |
| 2010/0300566 A1 | * | 12/2010 | Roberts | ............... F16K 17/0473 137/614.05 |

FOREIGN PATENT DOCUMENTS

| | | |
|---|---|---|
| DE | 10 2007 036 201 A1 | 2/2009 |
| EP | 0 511 135 A1 | 10/1992 |

* cited by examiner

*Primary Examiner* — R. K. Arundale
(74) *Attorney, Agent, or Firm* — Seed IP Law Group PLLC

(57) ABSTRACT

A pneumatic device can include a hollow body including an intake aperture controlled by a system for injecting a gaseous fluid under pressure, an inflation aperture in communication with a tire at an initial pressure, and an exhaust aperture for venting the fluid externally. The pneumatic device can include a piston fitted so as to slide within at least one chamber of the body under the effect of the injection of the fluid via the intake aperture, the piston interoperates with a mobile assembly in combination with an exhaust flap valve to control inflation and deflation of the tire.

11 Claims, 3 Drawing Sheets

PNEUMATIC DEVICE FOR CONTROLLING THE AUTOMATIC INFLATION/DEFLATION, NOTABLY OF A TIRE

BACKGROUND

1. Technical Field

The invention pertains to the technical sector of controlled pneumatic devices for the automatic inflation/deflation of a tire, notably, but also of any recipient holding a gaseous fluid under pressure.

2. Description of the Related Art

Such controlled pneumatic appliances for automatic inflation/deflation of a tire are intended to be controlled remotely, notably from the passenger compartment of a vehicle, for example. These devices permit one to adjust the pressure of tires from inside the vehicle, via a simple interaction with a control interface. This is notably very useful for vehicles such as rally, military or agricultural vehicles, of which the tire pressures are generally lower than 5 bar. These devices are generally designed for all drivers of vehicles needing to vary the pressure of the tires. In particular, they allow one to vary the tire pressures so as to be suitable for the surfaces over which the said vehicle is traveling, the loads it is carrying, and the speed at which the vehicle is moving.

Other applications are possible for these devices—notably all applications in which it is necessary to automatically inject or remove, in a controlled manner, a gaseous fluid from a recipient holding the said fluid.

The closest state of the art in this domain, to the applicant's knowledge, is described in the European patent document number EP 0 511 135, of which the present applicant is the holder.

This patent document describes an arrangement of a controlled pneumatic appliance for the automatic inflation/deflation of a tire.

With reference to FIG. 1, this device for the inflation/deflation of a recipient is of a type that includes, firstly, a cavity (1) partitioned by a flexible membrane (2) into two chambers—referred to as the control (3) and exhaust (4) chambers—of which the first communicates with a relative pressurization circuit and the second communicates with a bore (5) connected to the recipient, and with at least one exhaust tube (6) venting externally to the cavity and, in addition, with a flap valve system (7) able to close or open a means of passage at least between the bore and the exhaust tube, and including:

- a seat (8) designed to interoperate with an inflation flap valve (9);
- a seat (10) connected to the bore (5) and designed to interoperate with an exhaust flap valve (11);
- a flexible component (12) tending to maintain the inflation flap valve (9) in the closed position on the seat (8);
- a flexible component (13) tending to maintain the exhaust flap valve (11) in the closed position on the seat (10).

This device of prior art is remarkable in that:
- the seat (8) is presented by the membrane (2) in the control chamber (3);
- the inflation flap valve (7) and the exhaust flap valve (11) are mounted in opposition, either side of the membrane (2), and are sensitive to the position of the said membrane, such as to form a mobile assembly of two flap valves servocontrolled by the membrane (2);
- and in that the flexible component (13) is associated with the membrane (2);

and in that a travel limiter (14) is incorporated, limiting the travel of the assembly during the opening of the exhaust flap valve (11).

One disadvantage of this device is that its arrangement is implemented in a manner that the deflation of the recipient occurs at low pressure. This means that it is impossible, when the said device interoperates with a measuring device, to be able to take a measurement at low pressure. This is because if one wants to take a measurement of a relatively low pressure, one would change directly to the tire deflation phase instead of taking the measurement. Many vehicles use low inflation pressures of less than 5 bar—notably agricultural vehicles, vehicles for geological research, four-wheel-drive vehicles, etc.

BRIEF SUMMARY

The invention is intended to remedy this disadvantage in a simple, sure, effective and rational manner.

The problem that the invention is designed to resolve is to implement a controlled pneumatic device for automatic inflation/deflation, notably of a tire, that is able to cope with pressures at the lower limit. This means that, with such a device, it will be possible to inflate a tire at low pressure, but also to measure a low pressure.

To resolve such a problem, the applicant has designed and developed a controlled pneumatic device for automatic inflation/deflation, notably of a tire, incorporating a hollow body including an intake aperture interoperating with a system of injection of a gaseous fluid under pressure—notably air—an inflation aperture in communication with the tire at a pressure (P0), and an exhaust aperture venting the said gaseous fluid externally to the hollow body.

According to the invention, this device includes a piston mounted sliding in at least one chamber of the body under the effect of the injection of the gaseous fluid under pressure, by means of the intake aperture; the said piston interoperates with a mobile assembly operating in combination with an exhaust flap valve, in such a manner that:

- under the effect of the injection of the gaseous fluid at a pressure (P1>P0), the piston and the mobile assembly are moved linearly against a first flexible component in relation to the exhaust flap valve, which remains fixed, as far as a travel limitation position of the said piston and the said assembly, corresponding to the opening of the inflation aperture and the closure of the exhaust aperture;
- under the effect of the injection of the gaseous fluid at a pressure (P2>P1), the piston is moved against a second flexible component and in relation to the mobile assembly, which remains in travel limitation position, causing the closure of an inflation component (39) and the movement of the exhaust flap valve against a third flexible component, corresponding to the opening of the exhaust aperture from the inflation aperture, which remains open.

This way, the injection of a gaseous fluid at a pressure P1 exceeding P0 causes the opening of the injection flap valve and enables inflation of the tire connected to the inflation aperture. The injection of a gaseous fluid at a pressure P2 exceeding P1 causes the opening of the injection flap valve and the exhaust flap valve, and the closure of the inflation component, which enables the deflation of the tire. The injection of the said gaseous fluid is done in a controlled manner via a control interface, from the passenger compartment of a vehicle, for example.

In one embodiment, the body includes three internal chambers arranged in a successive manner; the said piston is able to slide within the first chamber, thereby dividing it into two areas at different pressures; openings are provided between the first area of the first chamber and the second chamber, and the second and third chambers, therefore allowing their communication; the first area of the first chamber incorporates the said intake aperture on one side of the said piston, and the second area of the first chamber incorporates the said exhaust aperture on the other side of the said piston, while the third chamber incorporates the said inflation aperture.

In one embodiment, in the device according to the invention, the said piston includes a hollow piston head designed to slide in an impermeable manner in the first chamber, and a hollow piston body in communication with the said piston head and designed to slide in an impermeable manner within the exhaust flap valve blocking the opening provided between the second area of the first chamber and the second chamber; the piston body opens into the second chamber and, being blocked by the mobile assembly, the said body and the said piston head are in communication with the intake aperture.

The said mobile component incorporates a central shaft sliding within the hollow body, an injection flap valve and an inflation component mounted fixed on the said shaft; the said injection flap valve is arranged so as to block the opening between the second and third chambers, and the said inflation component is designed to block the first area of the first chamber and the second chamber.

In one embodiment, the said inflation component incorporates a first guidance part taking the form of a cylindrical component fixed on the shaft and inserted partly, in an unsealed manner, in the end of the piston body; a second part acting as an inflation flap valve also takes the form of a cylindrical component of a diameter essentially equal to that of the piston body, designed to come into contact with the said piston body, and a third part taking the form of a checking flap valve influenced by the direction of passage of the gaseous fluid, such as to be free in the direction from the first area of the first chamber to the second chamber, and impermeable to a rapid flow going in the reverse direction, and permeable to a slow flow going in this same reverse direction.

Advantageously, to allow more comfort of use and precision of the device according to the invention, it is controlled by a pressure measurement system connected to the intake aperture.

In this manner, it is possible to take a measurement of the pressure present in the tire, by means of any system allowing a pressure measurement, such as a pressure gage, for example. This device also allows the pressure to be measured statically.

In a particular form of implementation of the invention, the first flexible component is secured to one end of the said injection flap valve and, at the other end, presses against the opposing wall of the third chamber. The second flexible component is arranged within the said piston between the bottom of the said piston and the first guidance part of the said inflation component. The third flexible component is fixed to one end of the said exhaust flap valve and, at the other end, presses against the opposing wall of the said second chamber.

BRIEF DESCRIPTION OF THE SEVERAL VIEWS OF THE DRAWINGS

Other characteristics and advantages of the invention will come clearly to the fore in the description to be found below, provided for information purposes only, and not in any way limitative, and being written with reference to the appended Figures, in which.

DETAILED DESCRIPTION

Figure 1:
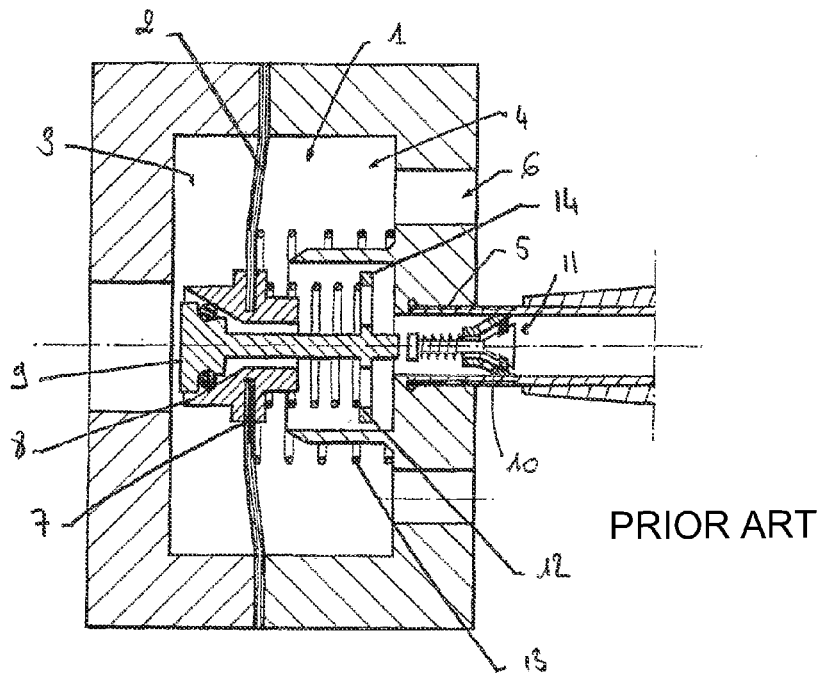
FIG. 1 is a longitudinal cross-section of a controlled pneumatic device for automatic inflation/deflation of a tire, notably according to prior art.

For simplification, the parts or components of one form of implementation, that exist in an identical or similar manner in another form of implementation, will be identified by the same numeric references, and will not be described again.

With reference to FIGS. 2 to 5, the controlled pneumatic device (15) for automatic inflation/deflation, notably of a tire, incorporates a hollow body (16) in an essentially-cylindrical form—albeit that this is not a limitative implementation—and incorporates three internal chambers (17, 18, 19) arranged in a successive manner.

The first chamber (17) incorporates an intake aperture (20) and an exhaust aperture (21). The intake aperture (20) is designed to be controlled by a gaseous fluid injection system generally composed of pipework components, rotating seals, pressure regulation systems, and a compressor, for example, and by a pressure measurement system such as a pressure gage. The exhaust aperture (21) is in communication with the exterior of the hollow body (16). During deflation of the tire, this enables evacuation of the gaseous fluid directly out from the hollow body (16), without going via the rotating seals and the pressure regulation system. Openings (22, 23) are provided between the first (17) and second (18) chambers, and the second (18) and third (19) chambers, thus allowing their communication. The third chamber (19) incorporates an inflation aperture (24) designed to be connected to the tire to inflate/deflate, or of which the pressure is to be measured. This inflation aperture (24) can, of course, be connected to any other recipient for the storage of gaseous fluid under pressure.

The chambers (17, 18, 19) and the apertures (20, 21, 24) are essentially cylindrical in form.

The connections between the apertures (20, 21, 24) and the systems for measurement or injection of gaseous fluids, or with the tire, are composed of flexible pipes well known to an appropriately-knowledgeable professional. Because the device (15) is mounted on the wheel rim of the vehicle, the connection between the compressor and the said device (15) is composed of a system incorporating a rotating seal. Given that this system does not form part of the invention and is also well known to an appropriately-knowledgeable professional, it will not be described in further detail.

A piston (25) is installed in the first chamber (17) and thus divides it into two areas (17a, 17b) of different pressures. The intake aperture is present in the first area (17a), while the exhaust aperture is present in the second area (17b). The piston (25) is able to slide between the intake aperture (20) and the exhaust aperture (21). This piston (25) includes a piston head (25a) and a piston body (25b). The piston head (25a) is cylindrical and essentially of the same diameter as that of the first chamber (17). This piston head (25a) also includes a ring seal (26) fitted around its periphery, to enable it to slide within the first chamber (17) in an impermeable manner.

Extending from this piston head (25a) is the piston body (25b), which is also cylindrical, with a diameter smaller than that of the piston head (25a). The diameter of the piston body (25b) is such that it is able to enter the second chamber (18) through the opening (22) that is present. This piston body (25b) is able to slide in an impermeable manner within an exhaust flap valve (27) fitted in the second chamber (18), so as to block the said opening (22). The exhaust flap valve (27) therefore has the form of a cylindrical sleeve (27a) incorporating a shoulder (27b) designed to block the said opening (22). The face of the shoulder (27b) opposite the opening (22) incorporates a component acting as a seal (28) to ensure the impermeability. The sleeve (27a) is also designed to accommodate the piston body (25b), and thus includes a ring seal (29) around its inner periphery so as to also ensure impermeability.

The exhaust flap valve (27) is maintained in a position of blocking the opening (22) by means of a spring (30) secured at one end of the said sleeve (27a), while the other end presses against the opposing wall of the said second chamber (18).

A shoulder (31) is also implemented between the piston head (25a) and the piston body (25b). This shoulder (31) is designed to interoperate with the end of the sleeve (27a) so that, when the piston (25) slides and arrives at the end of its travel, it comes into contact against the said sleeve (27a) and causes it to slide against the said spring (30), to release the opening (22) present between the second area (17b) of the first chamber (17) and second (18) chamber.

The said piston (25) is hollow and open at both ends. The end located in the second chamber (18) is entirely open, while the end located in the first chamber (17) is open by means of at least one channel (32, 33), thereby leaving the piston (25) a rear face (34). Therefore, the piston (25) is in communication, at one end, with the intake aperture (20) and, at the other end, with the second chamber (18). The piston (25) also interoperates with a mobile assembly (35, 36, 39) incorporating a shaft (35) on which an injection flap valve is mounted, which is designed to block the opening (23) present between the second (18) and third (19) chambers. This injection flap valve (36) is associated with a spring (38) fixed to one end of the said injection flap valve (36), and to the other end pressing against the opposing wall of the third chamber (19). An inflation device (39) is also mounted secured onto the said shaft (35), and interacts with the open end of the said piston body (25b). The inflation device (39) incorporates three parts; a first guidance part (39a) is composed of a cylindrical component fixed onto the shaft (35), incorporating apertures to allow the gaseous fluid to pass, and inserts partially and in an unsealed manner, into the end of the piston body (25b), so as to guide the said piston (25) and keep it centered. The second part (39b) of the inflation device (39) acts as an inflation flap valve and is also cylindrical in form, of essentially the same diameter as the piston body (25b), and designed to come into contact with the said piston body (25b). This second part (39b) is also secured onto the shaft (35). The third part (39c) of the inflation device (39) has the form of a ring or a free-floating or flexible washer in elastomer material—notably rubber—installed flush and influenced by the direction of flow of the gaseous fluid. This third part plays the role of a checking flap valve (39c).

This third part (39c) is therefore a checking flap valve and has the purpose of retaining a fast flow traveling from the second chamber (18) to the first area (17a) of the chamber (17), to facilitate the venting of the first area (17a) of the chamber (17). This checking flap valve (39c) is not impermeable to a slow flow, so as to compensate small leaks in the piping, notably so as to stabilize the measurement phase.

An elastic component—notably a spring (40)—is fitted between the first part (39a) of the inflation device (39) and the rear face (34) of the piston (25) pushing the latter against a travel limiter component (41) secured to the end of the shaft (35).

Figure 2:
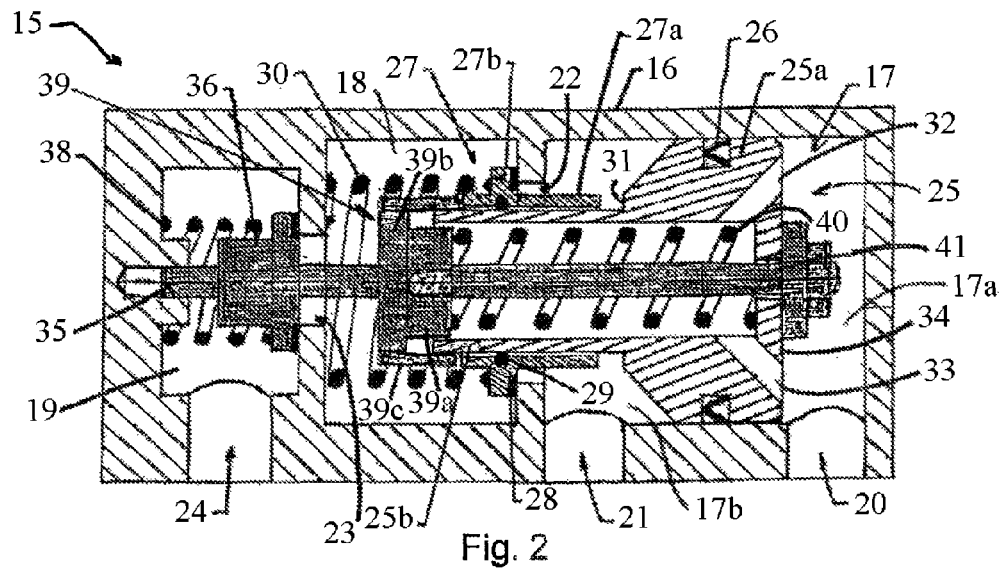
FIG. 2 is a longitudinal cross-section of a controlled pneumatic device for automatic inflation/deflation of a tire, notably according to the invention, in the resting position.

During usage, and with reference, first of all, to FIG. 2, which shows the resting phase of the device (15), the first (17) and second (18) chambers are at atmospheric pressure, while the third chamber is at the pressure of the tire, if a tire is connected to the inflation aperture (24). The piston (25) is in a resting position. The injection flap valve (36) of the third chamber (19) is closed and maintained in this position by the spring (38), as well as by the pressure of the tire. The inflation device (39) is in the open position, i.e., the second part (39b) does not come into contact with the end of the piston body (25b). The exhaust flap valve (27) is closed, and is maintained in this position by the spring (30).

Thus, one has—advantageously in relation to the state of the art—only one flap valve (36) that opens or that closes the connection with the tire.

In this situation, nothing happens: this is one of the advantages of the invention, because the first (17) and second (18) chambers are at atmospheric pressure, so the device (15) is not under constant pressure. Thus, in the resting phase, there is no force exerted on the rotating seals installed between the intake aperture (20) and the system for injecting gaseous fluid under pressure.

Figure 3:
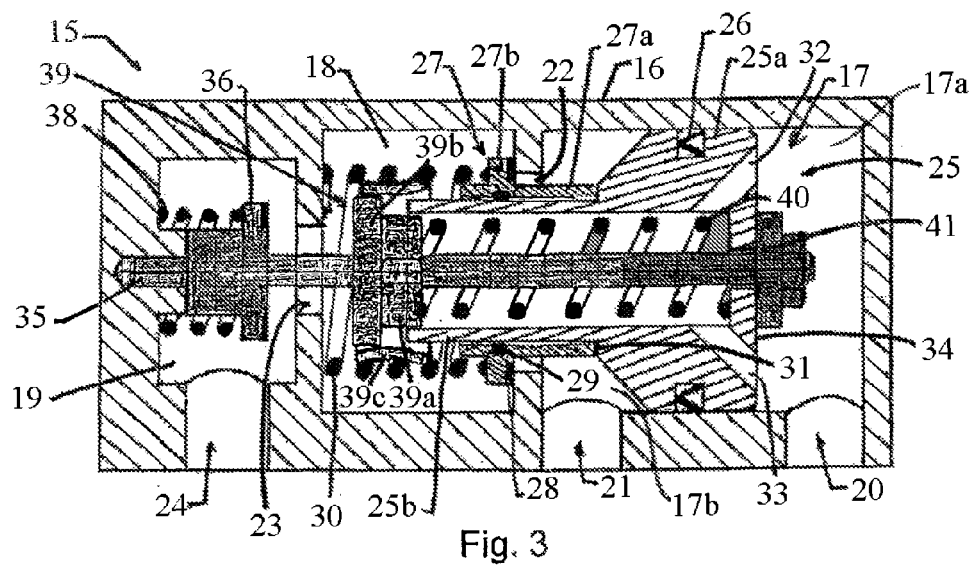
FIG. 3 is a longitudinal cross-section of a controlled pneumatic device for automatic inflation/deflation of a tire, notably according to the invention, in the inflation or measurement position.

With reference to FIG. 3, which illustrates the inflation phase, the first area (17a) of the first chamber (17) receives gaseous fluid under pressure. This chamber is then at a pressure P1 greater than the pressure P0 of the tire. This causes the sliding of the piston (25) as far as an inflation position, in which the shoulder (31) present between the piston head (25a) and the piston body (25b) comes into contact with the sleeve (27a) of the exhaust flap valve (27), without moving it. This movement of the piston (25) causes the simultaneous movement of the mobile assembly (35, 36, 39), i.e., the shaft (35), the injection flap valve (36), and the inflation device (39), as far as a position of bearing against one of the three components. In this form of implementation, it is the injection flap valve (36) that comes to rest against the opposing wall of the third chamber (19). Therefore, the spring (38) maintaining the flap valve in the closed position compresses, and the injection flap valve (36) frees the opening (23) present between the second chamber (18) and the third chamber (19). The exhaust flap valve (27) remains fixed and in the blocking position. At the arrival in travel limitation position, the pressure is such that it does not move any other component. The gaseous fluid then passes from the first area (17a) of the chamber (17) into the piston (25), escapes via the checking flap valve (39c), which allows passage in this direction, of the inflation device (39), which remains open, enters the second chamber (18), and crosses the third chamber (19), the injection flap valve (36) being open, to thereby inflate the tire.

To perform this inflation stage, it is obvious that the pressure P1 of the gaseous fluid injected by the intake aperture (20) has to be greater than that of the tire, P0. However, the force exerted by the said pressure also has to be sufficient to counteract the return force of the spring (38), which tends to maintain the injection flap valve (36) of the third chamber (19) in the closed position. This force exerted by the pressure must also be sufficiently weak not to counteract the return force exerted by the spring (40) within the piston (25) and thus not trigger the deflation phase.

It is obvious that the diameters of the chambers (17, 18, 19) and the stiffnesses of the springs (30, 38, 40) are calculated and modifiable to the design of the device, so as to obtain the desired pressure ranges.

During the measurement phase, and still with reference to FIG. 3, the arrangement is exactly the same, with the difference being that one stops the injection of fluid without venting the piping to open air. Accordingly, the components of the device (15) remain in the same position as for the inflation phase, the pressure of the tire achieves equilibrium with that of the three chambers (17, 18, 19) and of the piping through which one can read the value of the pressure in a static scenario, notably via a pressure gage. Because the checking flap valve (39c) is not impermeable to a slow flow of gaseous fluid, small leaks via the piping and the injection systems are compensated, so as to balance the pressure between the tire and the measurement system.

Figure 4:
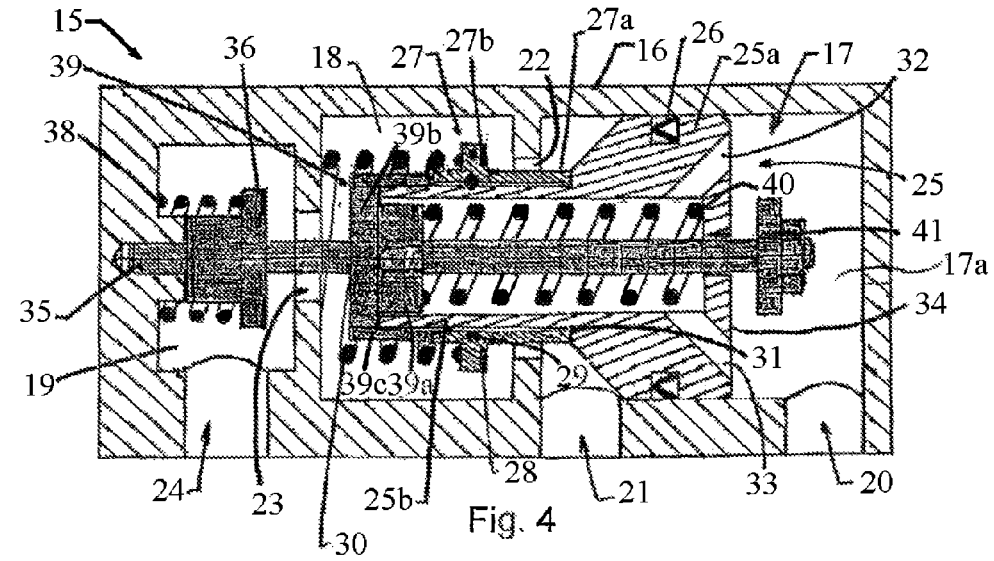
FIG. 4 is a longitudinal cross-section of a controlled pneumatic device for automatic inflation/deflation of a tire, notably according to the invention, in the deflation position.

With reference to FIG. 4, which illustrates the deflation phase, the first area (17a) of the first chamber (17) receives gaseous fluid under a pressure P2 that is greater than during the inflation phase. This chamber is then at a pressure P2 greater than the pressure P1. This causes the sliding of the piston (25) as far as an deflation position, in which the shoulder (31) present between the piston head (25a) and the piston body (25b) comes into contact with the sleeve (27a) of the exhaust flap valve (27), and moves it slightly so as to open the said exhaust flap valve (27) and free-up the opening (22). This movement of the piston (25) in this deflation position brings the end of the piston body (25b) into contact with the inflation flap valve (39b) of the inflation device (39), which has the consequence of closing it. This movement also cases the simultaneous movement of the mobile assembly (35, 36, 39), namely the shaft (35), the injection flap valve (36), and the inflation device (39), to a position of bearing against one of the three components. In this form of implementation, it is the injection flap valve (36) that comes to rest against the opposing wall of the third chamber (19). Therefore, the spring (38) maintaining the injection flap valve (36) in the closed position compresses, and the injection flap valve (36) frees the opening (23) present between the second chamber (18) and the third chamber (19). The two flap valves (27. 36) being in open positions, the gaseous fluid then passes from the tire to the third chamber (19), then, because the injection flap valve (36) is open and the inflation device (39) is closed, to the second chamber (18), then, because the exhaust flap valve (27) is also open, to the second area (17b) of the first chamber (17) on the exhaust aperture (17) side, so that the tire is accordingly deflated.

Obviously, to accomplish this deflation phase, the force exerted by the pressure injected via the intake aperture (20) has to be sufficiently big to counteract the return force of the three springs (30, 38, 40) present in the device (15), to allow the movement of the flap valves (36, 27) and the piston (25) as far as the deflation position.

The phase of return to the resting position is characterized by the fact that there is venting of the piping to open air at the intake aperture (20). Due to this, the gaseous fluid in the tire is braked by the checking flap valve (39c) of the inflation device (39), which is impermeable to a fast flow. Therefore, the pressure on the piston (25) is removed, and it can return to its resting position.

Figure 5:
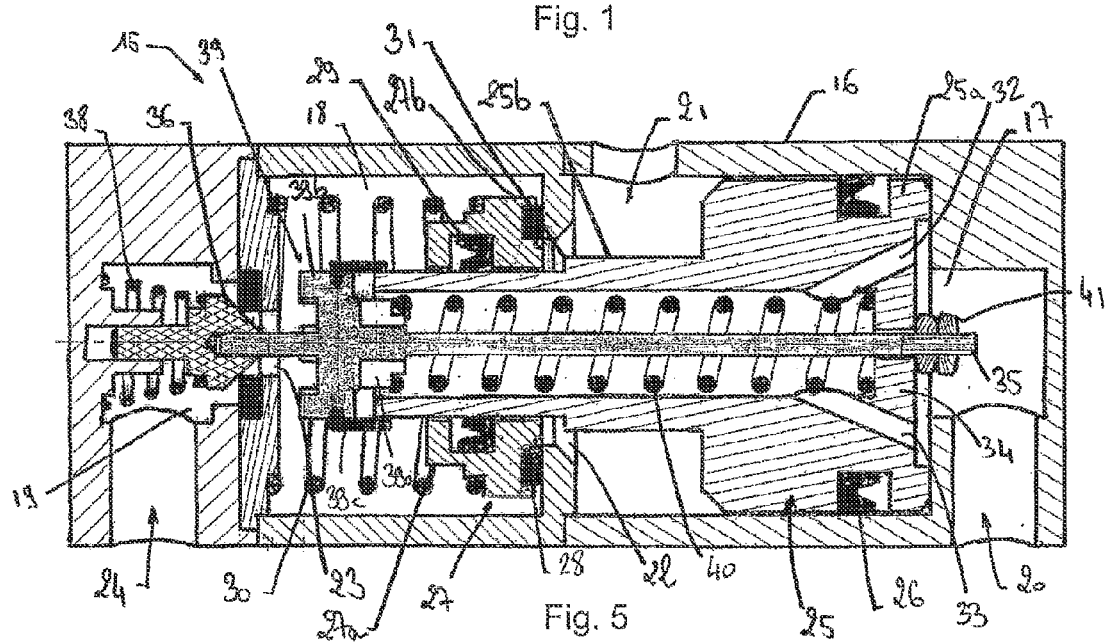
FIG. 5 is a longitudinal cross-section of another form of implementation of a controlled pneumatic device for automatic inflation/deflation of a tire, notably according to the invention, in the resting position.

FIG. 5 illustrates a second form of implementation of the device (15) according to the invention. This second form of implementation incorporates the same components as the first, but differs in that the travel limitation of the mobile assembly is performed by the inflation device (39). This ensures a better stability in the deflation position.

Figure 6:
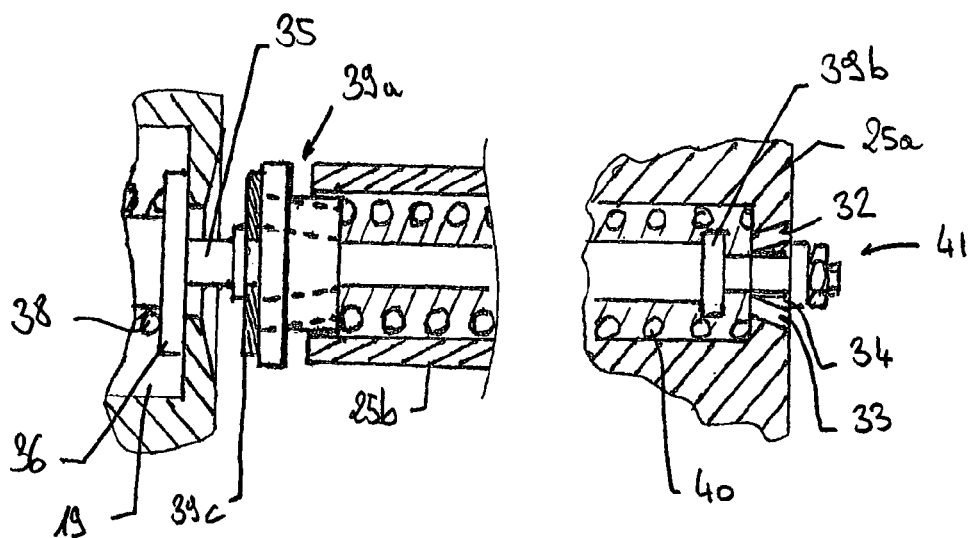
FIG. 6 is a longitudinal cross-section illustrating the mobile assembly interoperating with the piston, according to another form of implementation of the invention, in the resting position.

With reference to FIG. 6, another form of implementation is possible as regards the mobile assembly (35, 36, 39) of the piston (25). In this form of implementation, the checking flap valve (39c) of the inflation device (39) is composed of a flexible washer. The inflation flap valve (39b) is installed in the piston body (25) so as to allow the gaseous fluid to flow through the channels (32, 33) in the inflation phase, at the pressure P1 in the first area (17a) of the first chamber (17), and to come into contact with the bottom (34) of the piston (25), to block the channels (32, 33) and close the inflation device (32, 33), during the deflation phase, at the pressure P2 in the first area (17a) of the first chamber (17).

As will be understood from the above explanations, the invention provides a controlled pneumatic device (15) for automatic inflation/deflation, notably of a tire, giving full satisfaction and, in particular, having the advantages of being able to cope with pressures at the lower limit, namely, of being able to measure a low pressure, inflate a tire at low pressure, and deflate at high pressure. This device also enables a longer working life than certain devices of prior art.

It goes without saying that the invention is not limited to the form of implementation described above as an example, but also extends to all forms of implementation covered by the claims appended herewith.

The invention claimed is:

1. A pneumatic device for automatic inflation/deflation of an object, comprising: a hollow body, including an intake aperture fluidly connected to a system for injecting a gaseous fluid under pressure, an inflation aperture in fluid communication with the object at an initial pressure and an exhaust aperture for venting the gaseous fluid externally from the hollow body, wherein the pneumatic device incorporates a piston fitted so as to slide within at least one chamber of the body under the effect of the injection of the gaseous fluid under pressure via the intake aperture; and wherein the piston interoperates with a mobile assembly and an exhaust flap valve such that:

under the effect of the injection of the gaseous fluid at a second pressure which is greater than the initial pressure, the piston and the mobile assembly move to a travel limitation position linearly against a first flexible component in relation to the exhaust flap valve which remains fixed, said travel limitation position corresponding to the opening of an injection flap valve and the closure of the exhaust flap valve;

under the effect of the injection of the gaseous fluid at a third pressure which is greater than the second pressure, the piston moves against a second flexible component and in relation to the mobile assembly which remains in the travel limitation position, causing the closure of an inflation component and the movement of the exhaust flap valve against a third flexible component, providing fluid communication between the exhaust flap valve and the injection flap valve.

2. The device according to claim 1, wherein the at least one chamber is a first chamber and the body includes the first chamber, a second chamber, and a third internal chamber arranged in a successive manner; the piston is able to slide within the first chamber, thereby partitioning it into two areas at different pressures; openings are provided between the second area of the first chamber and the second chamber and between the second chamber and third chamber, thereby allowing fluid communication between the respective chambers.

3. The device according to claim 2, wherein the first area of the first chamber incorporates the intake aperture on a first side of the piston and the second area of the first chamber incorporates the exhaust aperture on a second side of the piston, and the third chamber incorporates the inflation aperture.

4. The device according to claim 2, wherein the piston incorporates a hollow piston head which slides in a fluidly impermeable manner within the first chamber, and a hollow piston body in communication with the piston head, which slides in a fluidly impermeable manner within the exhaust flap valve, blocking the opening provided between the second area of the first chamber and the second chamber.

5. The device according to claim 4, wherein the piston body opens into the second chamber and is blocked by the mobile assembly; the piston body and the piston head are fluidly connected to the intake aperture.

6. The device according to claim 2, wherein the mobile assembly incorporates a central shaft mounted so as to slide within the hollow body; the injection flap valve and the inflation component are mounted on the shaft; the injection flap valve is designed to block the opening between the second chamber and third chamber.

7. The device according to claim 6, wherein the inflation component incorporates a first guidance part taking the form of a cylindrical component fixed on the shaft and inserted partly, in an unsealed manner, in an end of the piston; a second part acting as an inflation flap valve also takes the form of a cylindrical component having a diameter essentially equal to that of a diameter of the end of the piston, the second part designed to contact the end of the piston, and a third part taking the form of a checking flap valve influenced by the direction of passage of the gaseous fluid, such as to be free in the direction from the first area of the first chamber to the second chamber, and impermeable to a rapid flow going in a reverse direction, and permeable to a slow flow going in the same reverse direction.

8. The device according to claim 1, wherein the pneumatic device interoperates with a pressure measurement system connected to the intake aperture.

9. The device according to claim 2, wherein a first end of the first flexible component is secured to an end of the injection flap valve and a second end of the first flexible component bears against an opposing wall of the third chamber.

10. The device according to claim 4, wherein the second flexible component is installed within the piston, between a bottom of the piston and a first guidance part of the inflation component.

11. Device according to claim 2, wherein a first end of the third flexible component is secured to an end of the exhaust flap valve and a second end of the third flexible component bears against an opposing wall of the second chamber.

* * * * *